United States Patent [19]

Yates

[11] 4,344,141

[45] Aug. 10, 1982

[54] GAS-TURBINE ENGINE CONTROL

[75] Inventor: Michael S. Yates, Andover, England

[73] Assignee: Smiths Industries Limited, London, England

[21] Appl. No.: 162,545

[22] Filed: Jun. 24, 1980

[30] Foreign Application Priority Data

Jun. 29, 1979 [GB] United Kingdom ............... 7922683

[51] Int. Cl.³ .............................................. F02C 9/08
[52] U.S. Cl. .................................. 364/442; 60/39.28 R
[58] Field of Search .................... 364/442; 60/39.28 R

[56] References Cited

U.S. PATENT DOCUMENTS

| | | | |
|---|---|---|---|
| 3,928,962 | 12/1975 | Maker | 60/39.28 R |
| 3,956,884 | 5/1976 | Eves | 60/39.28 R |
| 4,006,590 | 2/1977 | Itoh | 60/39.28 R |
| 4,077,204 | 3/1978 | Itoh | 364/442 X |
| 4,142,364 | 3/1979 | Wanger | 60/39.28 R |

Primary Examiner—David H. Malzahn
Attorney, Agent, or Firm—Pollock, Vande Sande & Priddy

[57] ABSTRACT

A control system for an aircraft gas-turbine engine has positive and negative acceleration control units. Each control unit has a memory storing values of the maximum or minimum desired rate of change of fuel flow at different speeds beyond which surge or extinction will occur. The control units produce output signals, in accordance with the engine speed and acceleration, for controlling fuel flow so that it follows closely within the surge or extinction curves. The system also has amplitude gates that pass one or the other of these output signals to the engine if the speed of engine demanded by the pilot is such as to cause surge or extinction.

15 Claims, 4 Drawing Figures

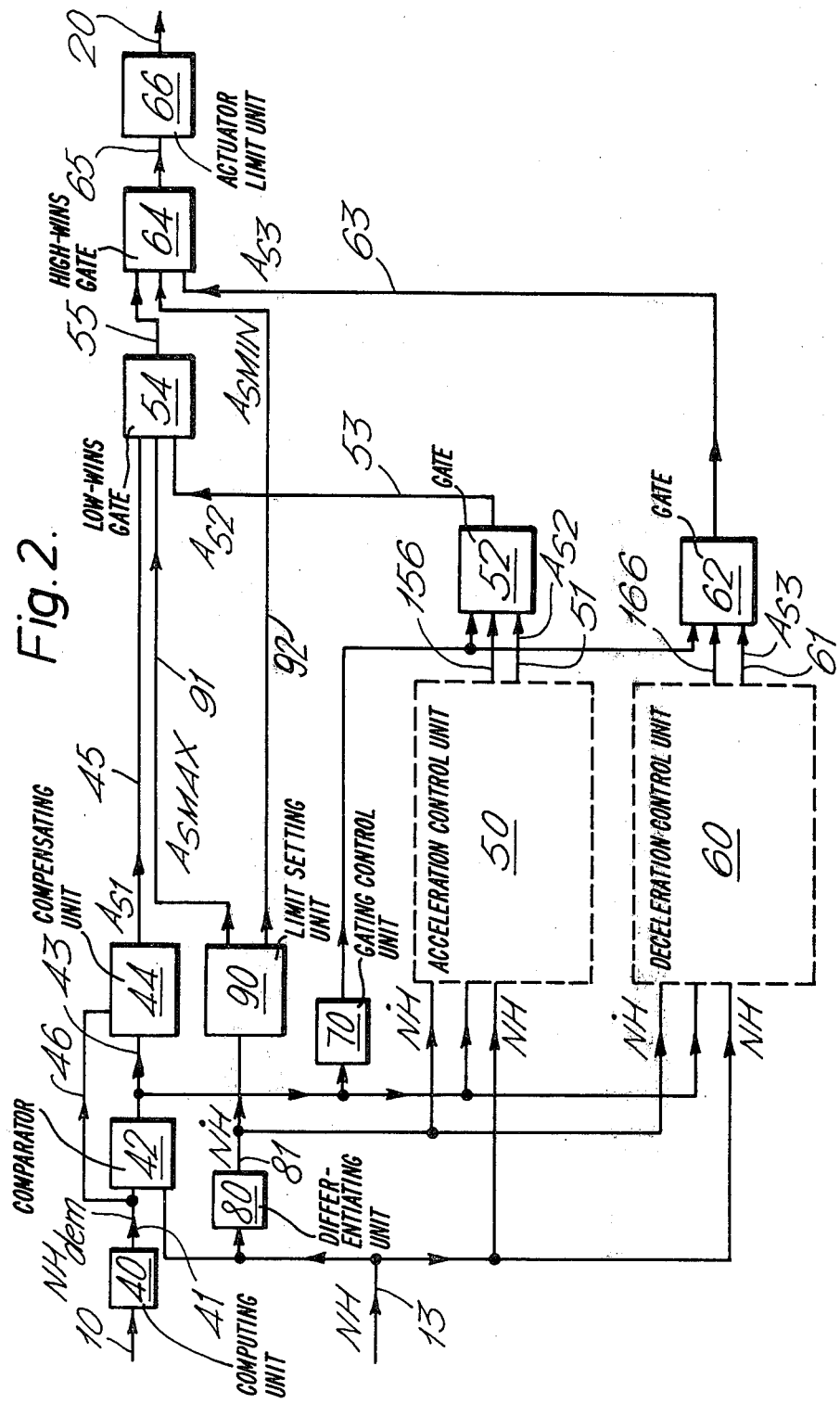

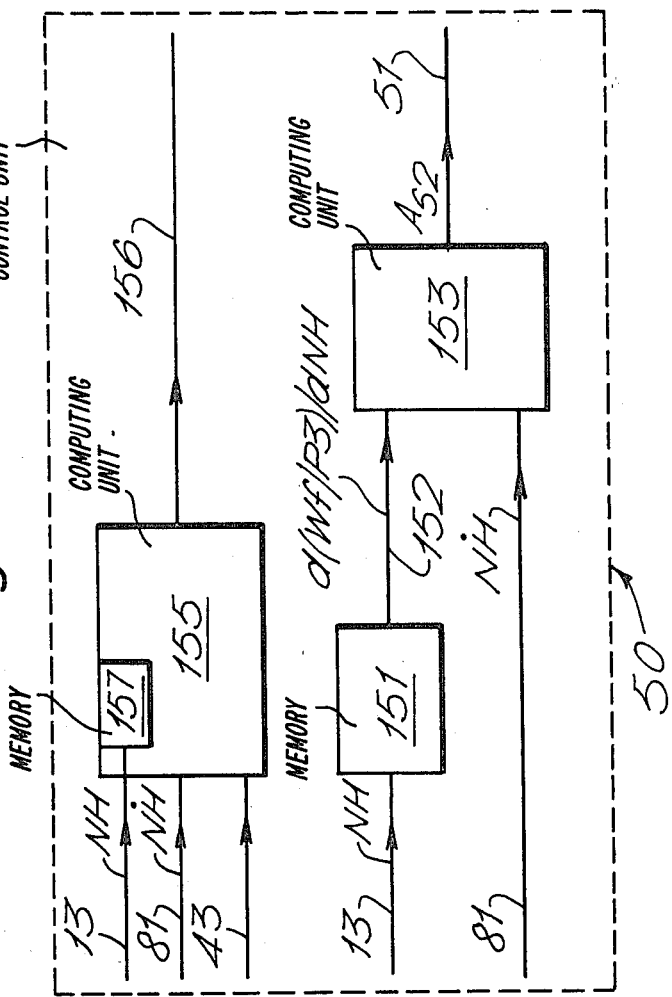

GAS-TURBINE ENGINE CONTROL

BACKGROUND OF THE INVENTION

This invention relates to a control system and a method of controlling fuel flow to a gas-turbine engine. The invention is especially, but not exclusively, applicable to gas-turbine engines in aircraft.

The speed of operation of a gas-turbine engine is commonly controlled by regulating the flow of fuel supplied to the engine. In order to prevent excess or too little fuel being supplied to the engine, which might cause malfunctioning of the engine, previous forms of control system have been arranged to regulate fuel flow in response to additional signals received from a fuel-flow sensor or from an actuator regulating fuel flow.

BRIEF SUMMARY OF THE INVENTION

It is an object of the present invention to provide a control system which does not require information regarding the flow of fuel to the engine but in which, nevertheless, the risk of supplying excess fuel is minimized.

According to one aspect of the present invention there is provided a control system for controlling fuel flow to a gas-turbine engine, the system receiving first input signals in response to the demanded speed of the engine and second input signals in response to the actual speed of the engine, wherein the system includes: control means including memory means storing information relating to values of a maximum or minimum desired fuel flow function at different engine speeds, the information being in the form of a rate of change with speed of a maximum or minimum desired fuel flow function at different engine speeds; and computing means that is arranged to provide a signal indicative of a rate of change with time of the fuel flow function in accordance with the information concerning rate of change with speed of a maximum or minimum desired fuel flow function and in accordance with engine speed function signals, the signal provided by said computing means being supplied for control of fuel flow to the engine.

In this way the supply of excess or too little fuel to the engine can be prevented without the need for fuel flow sensors.

The engine speed function signals may be derived in accordance with the rate of change in speed with time. The control system may include first control means that controls the engine when the demanded fuel flow exceeds a maximum desired fuel flow, and second control means that controls the engine when the demanded fuel flow is below the minimum desired fuel flow. The fuel flow to the engine may be controlled initially in response to the difference between the first input signals and the second input signals, the computing means supplying signals causing the fuel flow to be varied at substantially the rate of change with speed of the maximum or minimum desired fuel flow stored in the memory only when the fuel flow to the engine is close to the maximum or minimum desired fuel flow at the speed of the engine at that time. The rate of change of fuel flow to the engine may be varied in steps as the engine speed varies, the rate of change of fuel flow at each step being determined from the information in the memory in respect of that speed. The computing means may cause the rate of change of fuel flow to continue to be varied beyond the fuel corresponding to the demanded speed until the actual speed is within a predetermined range of the demanded speed, at which point the computing means changes the sense of the rate of change of fuel flow with speed.

According to another aspect of the present invention there is provided a method of controlling fuel flow to a gas-turbine engine including the steps of: generating first input signals in response to demanded speed of said engine; generating second input signals in response to the actual speed of the engine; storing information concerning a rate of change with speed of a maximum or minimum desired fuel flow function at different engine speeds; generating engine speed function signals; deriving from said stored information an output signal indicative of rate of change with time of the fuel flow function in accordance with said engine speed function signals; and supplying said output signal to control fuel flow to the engine.

A control system for an aircraft gas-turbine engine will now be described, by way of example, with reference to the accompanying drawings.

BRIEF DESCRIPTION OF THE DRAWINGS

FIG. 2 is a schematic diagram illustrating in greater detail the operation of the control system of FIG. 1;

FIG. 4 shows in greater detail a part of the system shown in FIG. 1.

DETAILED DESCRIPTION

Figure 1:
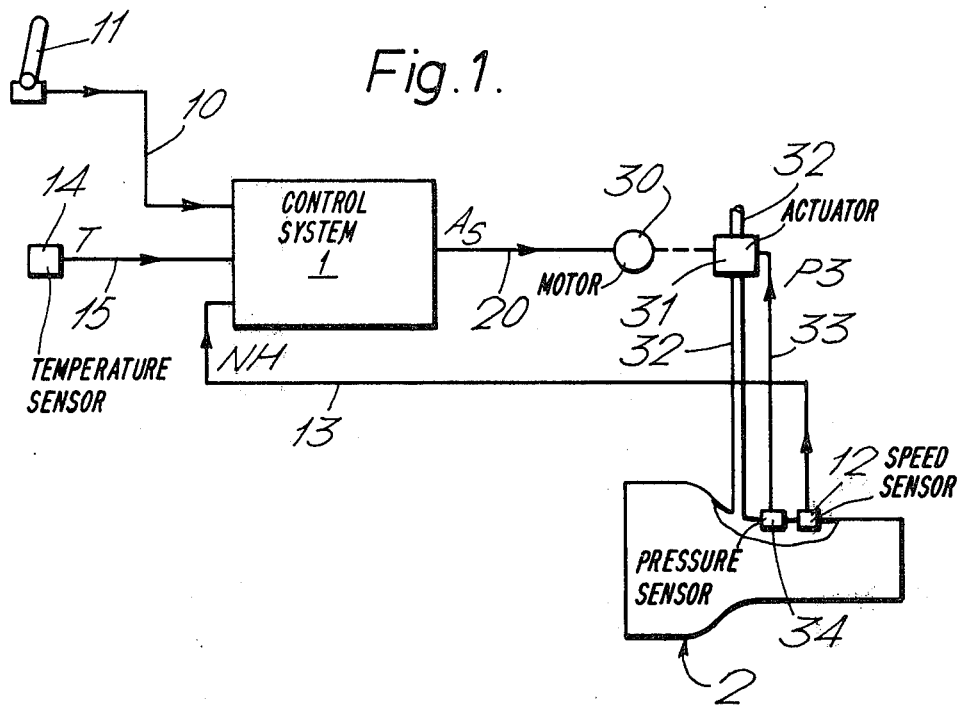
FIG. 1 is a schematic diagram showing the control system with an engine.

With reference to FIG. 1, the control system is shown diagrammatically associated with a gas-turbine engine 2 of an aircraft. In this embodiment, the control system is of the reversionary kind, that is, it is for use only when a fault occurs in the main control system (not shown) of the engine. In general, the main control system will receive input signals from many sources and will provide various output signals for accurate control of the engine. The reversionary control system 1 is, on the other hand, arranged to control the speed of the engine in response to fewer inputs so as thereby to be less expensive, more reliable and less susceptible to damage caused to the input sources. Upon detection of a fault in the main control system, the main control system is disconnected from the engine, so as thereby to prevent false control of the engine, and the reversionary control system 1 is switched to take full control. It will be appreciated that the invention is not restricted to reversionary or emergency control systems but could be used for the main control system of an engine.

The control system 1 receives input signals on line 10 in accordance with the position of the pilot's lever or throttle 11. A sensor 12 supplies signals on line 13 in accordance with the speed NH of the high pressure compressor stage of the engine 2. The speed sensor 12 may be of electromagnetic, inductive, optical or other well-known form. Signals representative of the ambient temperature T may also be supplied to the control system 1, from a temperature sensor 14 via line 15.

The purpose of the control system 1 is to control the speed NH of the engine 2 and it does this by regulating the supply of fuel to the engine. More particularly, the system 1 is arranged to supply output signals $A_S$ along line 20 to an electrical stepper motor 20. The signals $A_S$ on line 20 are representative of any required change in the speed of the engine 2 and are used to alter the position ACT of the output shaft of the motor 30; when $A_S=0$ the output shaft remains in the same position. The speed of a gas-turbine engine is a function of the ratio of fuel flow Wf to delivery pressure P3 of its high pressure compressor stage. The position ACT of the output shaft of the stepper motor 30 is therefore (a function of) the ratio Wf/P3, the slope of ACT against Wf/P3 being given by a value K. The value K is a function of actuator position but is virtually constant for most values of actuator position. The rate of change of position of the output shaft with time is given by the expression:

$$d\ ACT/dt = Kd(Wf/P3)/dt \qquad (1)$$

The actuator 31 is a hydromechanical device which controls the fuel flow Wf supplied to the engine 2 and, in this respect it is supplied with signals on line 33 from a pressure sensor 34 responsive to the pressure P3 of the engine. The fuel flow Wf is thereby controlled in response to a combination of the output shaft position ACT (which is proportional to Wf/P3) and the signals on line 33 representative of P3.

The way in which the control system 1 derives the output signals on line 20 in accordance with the input signals on lines 10, 13 and 15 will now be described with reference to FIG. 2.

Signals on line 10 in accordance with the position of the pilot's lever 11 are supplied to a computing unit 40 within the control system 1. The unit 40 derives an output signal $NH_{dem}$ on line 41 representative of the high pressure compressor speed demanded by the pilot. The signals $NH_{dem}$ on line 41 are supplied to a comparator unit 42 which also receives signals on line 13 from the speed sensor 12 in accordance with the actual speed NH of the engine 2. The comparator 42 supplies signals indicative of the difference between the demanded speed $NH_{dem}$ and the actual speed NH via line 43 to a compensating unit 44. The compensating unit 44 produces output signals $A_{S1}$ on line 45 for use in controlling the change in position of the output shaft of the stepper motor 30. The signals $A_{S1}$ are derived by the compensating unit 44 in accordance with the difference signals on line 43, and the demanded speed signal $NH_{dem}$, as supplied via line 46, with knowledge of the dynamics of the engine 2 at different speeds.

The control unit 1 also includes an acceleration control unit 50 which computes a maximum desired acceleration of the engine 2, in the manner described in detail below, and from this produces signals $A_{S2}$ indicative of the maximum desired change in position of the stepper motor output shaft in one direction.

The control system 1 further includes a deceleration control unit 60 which computes a maximum desired deceleration of the engine 2, in the manner described in detail below, and from this produces signals $A_{S3}$ indicative of the maximum change in position of the stepper motor output shaft in the opposite direction.

If the fuel flow of the engine 2 were rapidly increased upon, for example, a demand for rapid acceleration, the pressure of expanding gases produced by combustion of the fuel would impede air flow through the engine resulting in possible overheating and damage to the engine; this condition is known as "surge". If, alternatively, the fuel flow to the engine were reduced below predetermined limits, upon, for example, a demand for a rapid reduction in speed, there would be too little fuel to support combustion and ignition would fail; this condition is known as "extinction". The control system 1 is operated normally to control the actuator 31 in accordance with the demanded change in speed to the engine 2 but if the demanded change in position of the stepper motor 30 in one direction exceeds a value which would cause surge, as computed by the acceleration control unit 50, the actuator is instead controlled by the acceleration control unit. On the other hand, if the demanded change in position of the stepper motor 30 in the other direction exceeds a value which would cause extinction, as computed by the deceleration control unit 60, the actuator 31 is instead controlled by the deceleration control unit.

The output signals $A_{S2}$ and $A_{S3}$ from the acceleration and deceleration control units 50 and 60 respectively are supplied via lines 51 and 61 to respective gates 52 and 62. The gates 52 and 62 are controlled by signals from a gating control unit 70 and on lines 156 and 166 from the acceleration and deceleration control units 50 and 60 respectively. The gating control unit 70 is arranged such that, when the difference signals on line 43 fall below a predetermined level, the signals $A_{S2}$ on line 51 are multiplied by a large positive value so as thereby to produce a high signal on line 53 whereas the signals $A_{S3}$ on line 61 are multiplied by a large negative value, so as thereby to produce a low signal on line 63. The output of the acceleration gate 52 is supplied via line 53 to one input of a three-input low-wins gate 54, whereas the output of the deceleration gate 62 is supplied via line 63 to one input of a three-input high-wins gate 64. In this way, when the difference signal is low, the acceleration and deceleration signals from units 50 and 60 are blocked by the gates 54 and 64.

The system also includes a filter or differentiating unit 80 which computes the acceleration whether positive or negative (that is, deceleration) NH of the engine 2 from the engine speed signals NH on line 13. The acceleration signals are supplied by the unit 80 via line 81 to the acceleration control unit 50, to the deceleration unit 60 and to a limit-setting unit 90. The limit-setting unit 90 computes a maximum stepper motor control signal $A_{SMAX}$ commensurate with the engine acceleration NH and supplies this via line 91 to one input of the low-wins gate 54; the limit setting unit also computes a minimum stepper motor control signal $A_{SMIN}$ commensurate with the engine acceleration NH and supplies this via line 92 to one input of the high-wins gate 64. The limit setting unit 90 acts only to set maximum and minimum limits which should not be passed, the signals $A_{SMAX}$ or $A_{SMIN}$ only being supplied to control the stepper motor 30 upon a malfunction in the system.

The third input to the low-wins gate 54 receives the signals $A_{S1}$ on line 45 while the third input to the high-wins gate 64 receives the output from the low-wins gate 54 (either $A_{S2}$, $A_{SMAX}$ or $A_{S1}$) via line 55. In normal operation, that is, when the speed demanded by the pilot $NH_{dem}$ is not such as to cause surge or extinction, the acceleration gate 52 is arranged to supply an excessively large output on line 53 whereas the deceleration gate 62 is arranged to supply a large negative output on line 63. In this way, the signals $A_{S2}$ will be greater than the other inputs to the low-wins gate 54, and the output of the low-wins gate on line 55 will therefore b $A_{S1}$. Since the signals $A_{S3}$ on line 63 are lower than the other inputs to the high-wins gate 64, the signals $A_{S1}$ on line 55 will be passed to the output of the high-wins gate 64 on line 65. Signals on line 65 are supplied via an actuator limit unit 66 to line 20 at the output of the system 1. The actuator limit unit 66 merely acts to prevent the actuator step change per iteration exceeding a predetermined limit.

Figure 3:
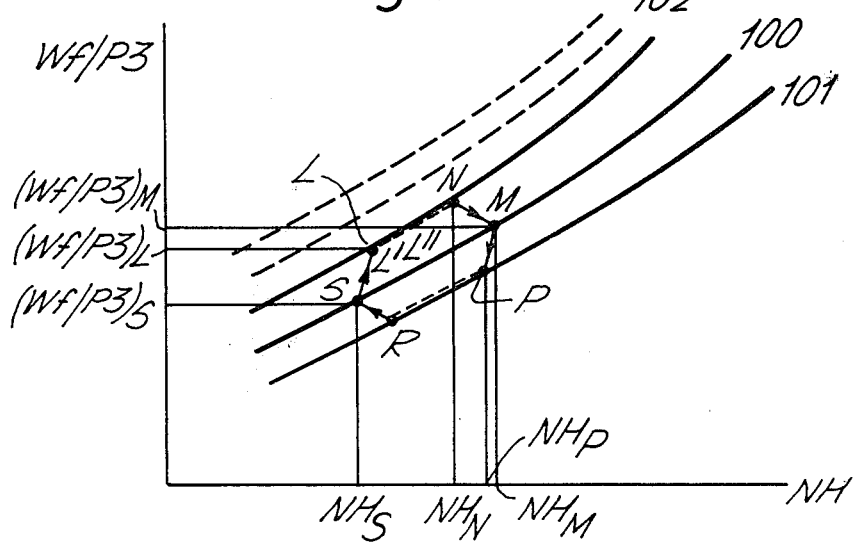
FIG. 3 is a graph showing the change in engine speed with a function of fuel flow.

The graph in FIG. 3 illustrates the way in which engine speed NH changes for change in the ratio Wf/P3. The line 100 shows the steady state condition in which the engine 2 is operated at a constant speed. The line 101 represents the limit below which extinction occurs, and the family of lines 102 represent the limits above which surge will occur at various different values of such factors as ambient temperature or pressure. It is important when the speed of the engine 2 is to be changed, that the ratio Wf/P3 lies between the two lines 101 and 102. While surge and extinction can readily be prevented if the control system is supplied with fuel-flow or actuator position information, in the present arrangement the system 1 is not supplied with this information and instead operates to prevent surge and extinction using only information from the three sources referred to above.

An increase or decrease in the ratio Wf/P3 does not cause an immediate corresponding change in the speed NH, there will instead be a time lag because of the inertia of the engine 2 and the time taken for combustion of the fuel. A change in the ratio Wf/P3 will therefore cause a momentary departure from the line 100 although if the ratio is maintained at a changed value the engine speed will keep changing until it resumes its steady state on line 100.

The acceleration control unit 50 in the present arrangement operates such that, when excessive acceleration is demanded, the ratio Wf/P3 is increased with increasing engine speed NH along a path comprising a number of successive steps each parallel to the surge lines 102. Assume, for example, that the engine 2 is operating at a constant speed $NH_S$, at a point S along the steady state line 100 and that the pilot adjusts his lever 11 rapidly requiring the engine to be accelerated to a speed $NH_M$ with a corresponding steady state ratio $(Wf/P3)_M$. Because of the lag between change in the ratio Wf/P3 and change in the speed NH, if the engine 2 were controlled directly by movement of the lever 11, the ratio Wf/P3 would exceed the surge value at the speed $NH_S$, as defined by the line 102. The system 1 of the present invention instead changes the ratio Wf/P3 more gradually so that the engine speed NH and the ratio Wf/P3 follow the path SLNM without crossing the surge line 102. The ratio Wf/P3 is initially increased rapidly to a value $(Wf/P3)_L$ just below the surge line 102, the engine speed NH only increasing by a small amount during this rapid rise in the ratio. The slope of the line 102 at the point L is then determined from tables and the ratio Wf/P3 is increased such that the engine speed NH and the ratio follow a small step parallel to this slope as far as the point L'. At the point L' the slope of the line 102 directly above L' is again determined from the tables and the ratio Wf/P3 is increased such that the engine speed NH and the ratio follow a small step parallel to the slope at the point L' as far as the point L". This process is repeated step-by-step, the ratio Wf/P3 rising above that set by the pilot $(Wf/P3)_M$ as the speed of the engine 2 approaches the desired speed $NH_M$. When the difference between the desired engine speed $NH_M$ and the actual engine speed becomes small, that is, at $NH_N$, the output of the compensating unit 44 becomes negative so as thereby to reduce the ratio Wf/P3 and bring the engine speed back along line NM to the steady state line 100 without exceeding the required speed $NH_M$. By following the surge line 102 as closely as possible, in the manner described, the speed of the engine is changed as quickly as possible without actually surging.

Deceleration is controlled by the deceleration control unit 60 in a similar manner. If the engine speed is to be reduced rapidly from $NH_M$ to $NH_S$ the ratio Wf/P3 and the speed NH are controlled to follow the path MPRS. The ratio is first reduced rapidly from $(Wf/P3)_M$ to $(Wf/P3)_P$ so that the engine speed is reduced to the value $NH_P$ at a point close to the extinction line 101. The slope of the extinction line 101 at the point P is determined from tables and the ratio Wf/P3 is then reduced in steps so that the speed NH follows successive lines parallel to the slope of the extinction line. This continues step-by-step to the point R, when the actual engine speed $NH_R$ is close to the demanded speed and the ratio Wf/P3 is then increased to $(Wf/P3)_S$ along the path RS such that the speed falls to $NH_S$ without going below it.

The acceleration control unit 50 will now be described in greater detail with reference to FIG. 4. The unit 50 includes a memory 151 in which is stored a table giving the slope d(Wf/P3)/dNH of the surge line 102 for different values of the speed NH. The memory 151 receives the signals NH on line 13 representative of the actual engine speed and produces output signals on line 152 representative of the value of d(Wf/P3)/dNH of the surge line 102 at that speed. The signals on line 152 are supplied to a computing unit 153 together with the signals NH on line 81 representative of engine acceleration. The computing unit 153 multiplies its two input signals in accordance with the following expression:

$$(d(Wf/P3)/dNH) \times NH = d(Wf/P3)/dt \qquad (2)$$

The computing unit 153 also multiplies the signals representative of d(Wf/P3)/dt by the value K according to expression (1) to give a signal in accordance with the required rate of change in position dACT/dt of the stepper motor 30. Calculation of the value dACT/dt is performed once every $T_i$ seconds and, in general, many such calculations are performed each second. The computing unit 153 further multiplies the signals dACT/dt by the time period $T_i$ so as thereby to give the signal $A_{S2}$ at the output of the computing unit on line 51 according to the expression:

$$A_{S2} = (dACT/dt) \times T_i \qquad (3)$$

The acceleration control unit 50 also includes a second computing unit 155 which receives signals on line 13 representative of actual engine speed NH, signals on line 81 representative of engine acceleration NH and signals on line 43 representative of the difference between demanded speed and actual speed. The second computing unit 155 produces a signal on line 156 which is supplied to the third input of the acceleration gate 52. The computing unit 155 includes a memory 157 having a table of the maximum desired values of engine acceleration $NH_{MAX}$ at different engine speeds. The memory is addressed by the signals on line 13 and its output is compared with the signals on line 81 representative of the actual engine acceleration. The unit 155 produces a high output signal on line 156, thereby blocking the signals $A_{S2}$ at the low-wins gate 54, when the maximum acceleration $NH_{MAX}$ permitted is greater than the actual acceleration NH and when the difference signals on line 43 are above a predetermined value. In this way, the signals $A_{S1}$ are passed by the low-wins gate 54 until the acceleration of the engine approaches its maximum level, that is, along the line SL in FIG. 3. When the engine acceleration approaches the maximum the output of unit 155 reverts to zero such that the signals $A_{S2}$ are passed by the low-wins gate 54 if these are less than $A_{S1}$. The engine is then controlled in steps from L to N by the acceleration control unit 50, in the manner described earlier. At N the output of the gate 52 goes high by application of a high signal from the gating control unit 70 and the engine is then controlled by the signals $A_{S1}$ in the manner described above.

The deceleration control unit 60 functions in an analogous amnner to the acceleration control unit 50. The output of the deceleration control unit 60 as passed by the gate 62 is arranged to be low, so that the engine 2 is controlled by signals $A_{S1}$, during the intervals M to P and R to S. During the interval P to R a table of the slope of the extinction line 101 at different engine speeds is addressed and the fuel flow altered such that the engine performance follows a number of successive steps parallel to the extinction line 101.

It will be appreciated that the circuit shown in FIGS. 2 and 4 is only of schematic nature and that the various computing and calculating steps need not necessarily be carried out by discrete units or circuits within the acceleration and deceleration control units 50 and 60 but would in practice be carried out as steps in the programming of equipment such as a microprocessor.

The term acceleration has been used to denote both positive and negative acceleration, that is, deceleration.

It is not necessary to prevent both surge and extinction by the arrangement described above. In some circumstances surge or extinction may be prevented instead, for example, by setting a predetermined maximum or minimum value of fuel flow.

I claim:

1. A control system for controlling fuel flow to a gas-turbine engine, the system including: first means for receiving first input signals in response to demanded speed of said engine; second means for receiving second input signals in response to the actual speed of the engine; memory means storing information concerning rate of change with speed of a maximum or minimum desired fuel flow function at different engine speeds; computing means; means supplying engine speed function signals from said first and second means to said computing means; means supplying signals from said memory means to said computing means, said computing means providing an output signal indicative of rate of change with time of the fuel flow function in accordance with said signals supplied to said computing means; and means supplying said output signal to control fuel flow to the engine in predetermined circumstances.

2. A control system according to claim 1, wherein said means supplying engine speed function signals to said computing means is differentiating means, said engine speed function signals being dependent on the rate of change of speed with time.

3. A control system according to claim 1, including control means wherein said control means includes: second computing means including second memory means, said second memory means storing information concerning maximum desired values of rate of change of engine speed with time at different engine speeds; means supplying said second input signals to said second memory means so that said second memory means thereby provide a representation of the maximum desired rate of change of speed with time at the speed of the engine, said second computing means providing a second output signal dependent upon the difference between the representation provided by said second memory means and the actual rate of change of speed with time.

4. A control system according to claim 3, wherein said control system includes comparing means, means supplying said first and second input signals to said comparing means, said comparing means providing an output dependent upon the difference between said first and second input signals, and means supplying the output of said comparing means to said second computing means.

5. A control system according to claim 1, including: first control means including memory means storing information on rate of change with speed of a maximum desired fuel flow function at different engine speeds, said first control means providing output signals to control fuel flow to the engine when the demanded fuel flow function exceeds the maximum desired fuel flow function; and second control means including memory means storing information on rate of change with speed of a minimum desired fuel flow function is different engine speeds, said second control means providing output signals to control fuel flow to the engine when the demanded fuel flow function is below the minimum desired fuel flow function.

6. A control system according to claim 5, including: comparing means; means supplying said first and second input signals to said comparing means, said comparing means providing an output dependent upon the difference between said first and second input signals; low-wins gating means; means for deriving signals from the output of said comparing means; means supplying to said low-wins gating means output signals from said first control means and said signals derived from the output of said comparing means; high-wins gating means; means supplying to said high-wins gating means output signals from said second control means and output signals of said low-wins gating means.

7. A control system according to claim 6 including: first and second further gating means; means connecting said first and second further gating means intermediate respectively said low-wins gating means and said first control means, and said high-wins gating means and said second control means; gating control means; means supplying signals from said comparing means to said gating control means, said gating control means supplying a high value signal to said first further gating means when the difference between said first and second input signals is low; and means supplying said output signals from second computing means of each said control means to respective further gating means.

8. A control system for controlling fuel flow to an aircraft gas-turbine engine, the system including: means for receiving input signals in response to the actual speed of the engine; memory means storing information concerning rate of change with speed of a maximum or minimum desired fuel flow function at different engine speeds; computing means; differentiating means; means for supplying signals to said differentiating means from said means for receiving input signals, said differentiating means supplying signals dependent on the rate of change of speed with time to said computing means; means supplying signals from said memory means to said computing means, said computing means providing an output signal indicative of rate of change with time of the fuel flow function in accordance with said signals supplied to said computing means; and means supplying said output signal to control fuel flow to the engine in predetermined circumstances.

9. A control system for controlling fuel flow to a gas-turbine engine, the system including: first means for deriving signals from first input signals in response to demanded speed of said engine; second means for receiving second input signals in response to actual speed of the engine; memory means storing information concerning rate of change with speed of a maximum or minimum desired fuel flow function at different engine speeds; computing means; differentiating means; means supplying signals from said second means to said differentiating means, said differentiating means supplying signals dependent on the rate of change of speed with time to said computing means; means supplying signals from said memory means to said computing means, said computing means providing an output signal indiciative of rate of change with time of the fuel flow function in accordance with said signals supplied to said computing means; second computing means including second memory means storing information on maximum desired values of rate of change with time of engine speed at different engine speeds; means supplying said second input signals to said second memory means so that said second memory means thereby provides a representation of the maximum desired rate of change of speed with time at the speed of the engine, said second computing means providing an output signal dependent upon the representation provided by said second memory means and the signals from said differentiating means; amplitude gating means; and means supplying to said amplitude gating means output signals from said control means and signals derived from said first input signals.

10. A method of controlling fuel flow to a gas-turbine engine including the steps of: generating first input signals in response to demanded speed of said engine; generating second input signals in response to the actual speed of the engine; storing information concerning rate of change with speed of a maximum or minimum desired fuel flow function at different engine speeds; generating engine speed function signals; deriving from said stored information an output signal indicative of rate of change with time of the fuel flow function in accordance with said first and second input signals; and supplying said output signal to control fuel flow to the engine in predetermined circumstances.

11. A method according to claim 10, wherein said output signal is supplied to control fuel flow to the engine only when the actual rate of change of speed with time of said engine exceeds a maximum desired rate of change of speed with time of the engine.

12. A method according to claim 10 or 11, wherein said output signal is supplied to control fuel flow to the engine only when the difference between the actual speed of fhe engine and the demanded speed of the engine is more than a predetermined amount.

13. A method according to claim 10 wherein said output signal effects variation of fuel flow to said engine at substantially the rate of change with speed of the maximum or minimum desired fuel flow function only when the actual fuel flow function is close to said maximum or minimum desired fuel flow function at the actual speed of the engine.

14. A method according to claim 13 wherein said output signal is varied in steps, as the engine speed changes, in accordance with the information concerning rate of change of fuel flow function at each step.

15. A method according to claim 14 wherein the rate of change of fuel flow is varied beyond the flow corresponding to the demanded speed until the actual speed is within a predetermined range of said demanded speed, at which point the sense of the rate of change of fuel flow with speed is changed.

* * * * *